(12) United States Patent
Gnecchi

(10) Patent No.: US 11,159,738 B2
(45) Date of Patent: Oct. 26, 2021

(54) IMAGING DEVICES WITH SINGLE-PHOTON AVALANCHE DIODES HAVING SUB-EXPOSURES FOR HIGH DYNAMIC RANGE

(71) Applicant: SEMICONDUCTOR COMPONENTS INDUSTRIES, LLC, Phoenix, AZ (US)

(72) Inventor: Salvatore Gnecchi, Cork (IE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/670,740

(22) Filed: Oct. 31, 2019

(65) Prior Publication Data

US 2021/0092275 A1 Mar. 25, 2021

Related U.S. Application Data

(60) Provisional application No. 62/905,787, filed on Sep. 25, 2019.

(51) Int. Cl.
*H04N 5/00* (2011.01)
*G06T 7/00* (2017.01)
(Continued)

(52) U.S. Cl.
CPC ......... *H04N 5/2355* (2013.01); *G01S 7/4863* (2013.01); *G01S 17/89* (2013.01);
(Continued)

(58) Field of Classification Search
CPC .......... H04N 5/2355; G06T 7/521; G06T 2207/10028; G01S 7/4863
(Continued)

(56) References Cited

U.S. PATENT DOCUMENTS

2011/0240865 A1 10/2011 Frach et al.
2013/0334411 A1* 12/2013 Brunel .............. H01L 31/02019
250/252.1
(Continued)

FOREIGN PATENT DOCUMENTS

WO 2017172083 A1 10/2017

OTHER PUBLICATIONS

Beer et al., "Background Light Rejection in SPAD-Based LiDAR Sensors by Adaptive Photon Coincidence Detection." Sensors (Basel). vol. 18(12); Dec. 8, 2018.

*Primary Examiner* — Jeffery A Williams
(74) *Attorney, Agent, or Firm* — Treyz Law Group, P.C.; Joseph F. Guihan

(57) ABSTRACT

An imaging device may include single-photon avalanche diodes (SPADs). To improve the sensitivity and signal-to-noise ratio of the SPADs, photon detection efficiency (PDE) may be increased. However increased photon detection efficiency may result in a decreased saturation rate and lower than desired dynamic range. To increase the dynamic range, a SPAD-based semiconductor device may operate with multiple sub-exposures. During the first sub-exposure, an over-bias voltage may be set to a first voltage level so that the SPADs have a first photon detection efficiency. During the second sub-exposure, the over-bias voltage may be set to a second voltage level so that the SPADs have a second photon detection efficiency that is different than the first photon detection efficiency. Image data from the first and second sub-exposures may then be combined into a single high dynamic range depth map.

13 Claims, 11 Drawing Sheets

(51) Int. Cl.
*G01S 7/48* (2006.01)
*H04N 5/235* (2006.01)
*G06T 7/521* (2017.01)
*H04N 5/225* (2006.01)
*G01S 17/89* (2020.01)
*G01S 7/4863* (2020.01)

(52) U.S. Cl.
CPC ........... *G06T 7/521* (2017.01); *H04N 5/2256* (2013.01); *G06T 2207/10028* (2013.01); *G06T 2207/20208* (2013.01); *G06T 2207/20212* (2013.01)

(58) Field of Classification Search
USPC .......................................................... 348/135
See application file for complete search history.

(56) References Cited

U.S. PATENT DOCUMENTS

2018/0113200 A1\* 4/2018 Steinberg ............... G02B 26/10
2019/0302242 A1\* 10/2019 Fenigstein ........ H01L 31/02005
2020/0174105 A1\* 6/2020 Yin .......................... G01S 17/32

\* cited by examiner

IMAGING DEVICES WITH SINGLE-PHOTON AVALANCHE DIODES HAVING SUB-EXPOSURES FOR HIGH DYNAMIC RANGE

CROSS-REFERENCE TO RELATED APPLICATIONS

This application claims the benefit of U.S. Provisional Patent Application No. 62/905,787, filed on Sep. 25, 2019, the entire contents of which is incorporated herein by reference.

BACKGROUND

This relates generally to imaging systems and, more particularly, to imaging systems that include single-photon avalanche diodes (SPADs) for single photon detection.

Modern electronic devices such as cellular telephones, cameras, and computers often use digital image sensors. Image sensors (sometimes referred to as imagers) may be formed from a two-dimensional array of image sensing pixels. Each pixel typically includes a photosensitive element (such as a photodiode) that receives incident photons (light) and converts the photons into electrical signals. Each pixel may also include a microlens that overlaps and focuses light onto the photosensitive element.

Conventional image sensors may suffer from limited functionality in a variety of ways. For example, some conventional image sensors may not be able to determine the distance from the image sensor to the objects that are being imaged. Conventional image sensors may also have lower than desired image quality and resolution.

To improve sensitivity to incident light, single-photon avalanche diodes (SPADs) may sometimes be used in imaging systems. Single-photon avalanche diodes may be capable of single-photon detection. However, single-photon avalanche diodes may have lower than desired dynamic range.

It is within this context that the embodiments described herein arise.

DETAILED DESCRIPTION

Embodiments of the present invention relate to imaging systems that include single-photon avalanche diodes (SPADs).

Some imaging systems include image sensors that sense light by converting impinging photons into electrons or holes that are integrated (collected) in pixel photodiodes within the sensor array. After completion of an integration cycle, collected charge is converted into a voltage, which is supplied to the output terminals of the sensor. In complementary metal-oxide semiconductor (CMOS) image sensors, the charge to voltage conversion is accomplished directly in the pixels themselves, and the analog pixel voltage is transferred to the output terminals through various pixel addressing and scanning schemes. The analog pixel voltage can also be later converted on-chip to a digital equivalent and processed in various ways in the digital domain.

In single-photon avalanche diode (SPAD) devices (such as the ones described in connection with FIGS. 1-4), on the other hand, the photon detection principle is different. The light sensing diode is biased above its breakdown point, and when an incident photon generates an electron or hole, this carrier initiates an avalanche breakdown with additional carriers being generated. The avalanche multiplication may produce a current signal that can be easily detected by readout circuitry associated with the SPAD. The avalanche process can be stopped (or quenched) by lowering the diode bias below its breakdown point. Each SPAD may therefore include a passive and/or active quenching circuit for halting the avalanche.

This concept can be used in two ways. First, the arriving photons may simply be counted (e.g., in low light level applications). Second, the SPAD pixels may be used to measure photon time-of-flight (ToF) from a synchronized light source to a scene object point and back to the sensor, which can be used to obtain a 3-dimensional image of the scene.

Figure 1:
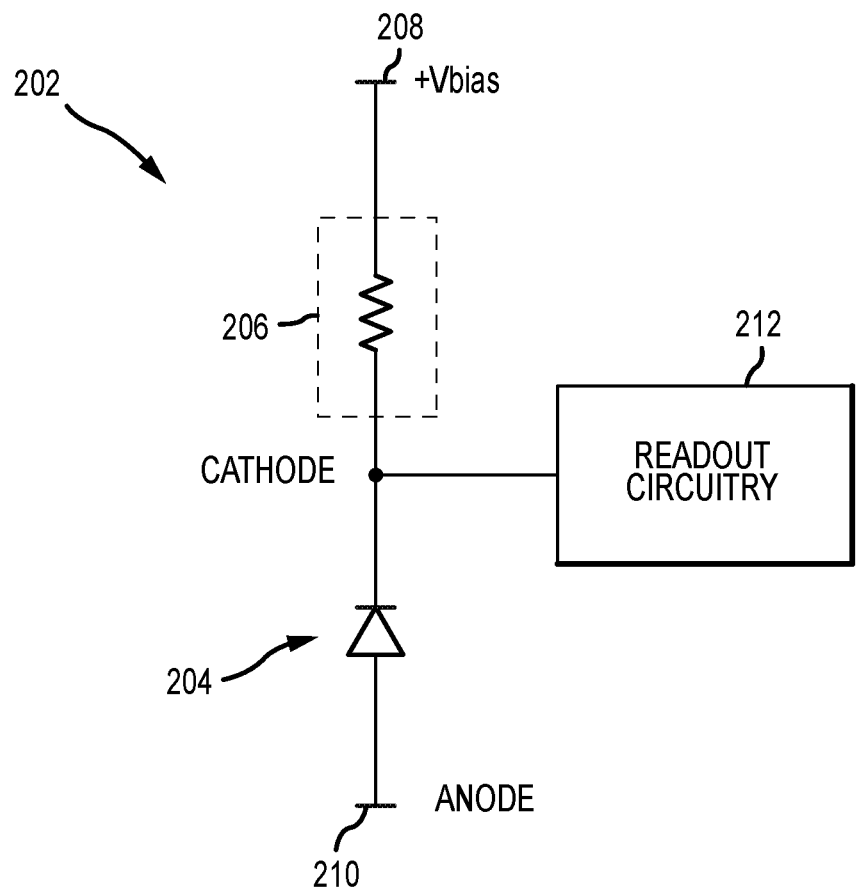
FIG. 1 is a circuit diagram showing an illustrative single-photon avalanche diode pixel in accordance with an embodiment.

FIG. 1 is a circuit diagram of an illustrative SPAD device 202. As shown in FIG. 1, SPAD device 202 includes a SPAD 204 that is coupled in series with quenching circuitry 206 between a first supply voltage terminal 210 (e.g., a ground power supply voltage terminal) and a second supply voltage terminal 208 (e.g., a positive power supply voltage terminal). In particular, SPAD device 202 includes a SPAD 204 having an anode terminal connected to power supply voltage terminal 210 and a cathode terminal connected directly to quenching circuitry 206. SPAD device 202 that includes SPAD 204 connected in series with a quenching resistor 206 is sometimes referred to collectively as a photo-triggered unit or "microcell." During operation of SPAD device 202, supply voltage terminals 208 and 210 may be used to bias SPAD 204 to a voltage that is higher than the breakdown voltage (e.g., bias voltage Vbias is applied to terminal 208). Breakdown voltage is the largest reverse voltage that can be applied to SPAD 204 without causing an exponential increase in the leakage current in the diode. When SPAD 204 is reverse biased above the breakdown voltage in this manner, absorption of a single-photon can trigger a short-duration but relatively large avalanche current through impact ionization.

Quenching circuitry 206 (sometimes referred to as quenching element 206) may be used to lower the bias voltage of SPAD 204 below the level of the breakdown voltage. Lowering the bias voltage of SPAD 204 below the breakdown voltage stops the avalanche process and corresponding avalanche current. There are numerous ways to form quenching circuitry 206. Quenching circuitry 206 may be passive quenching circuitry or active quenching circuitry. Passive quenching circuitry may, without external control or monitoring, automatically quench the avalanche current once initiated. For example, FIG. 1 shows an example where a resistor component is used to form quenching circuitry 206. This is an example of passive quenching circuitry.

This example of passive quenching circuitry is merely illustrative. Active quenching circuitry may also be used in SPAD device 202. Active quenching circuitry may reduce the time it takes for SPAD device 202 to be reset. This may allow SPAD device 202 to detect incident light at a faster rate than when passive quenching circuitry is used, improving the dynamic range of the SPAD device. Active quenching circuitry may modulate the SPAD quench resistance. For example, before a photon is detected, quench resistance is set high and then once a photon is detected and the avalanche is quenched, quench resistance is minimized to reduce recovery time.

SPAD device 202 may also include readout circuitry 212. There are numerous ways to form readout circuitry 212 to obtain information from SPAD device 202. Readout circuitry 212 may include a pulse counting circuit that counts arriving photons. Alternatively or in addition, readout circuitry 212 may include time-of-flight circuitry that is used to measure photon time-of-flight (ToF). The photon time-of-flight information may be used to perform depth sensing. In one example, photons may be counted by an analog counter to form the light intensity signal as a corresponding pixel voltage. The ToF signal may be obtained by also converting the time of photon flight to a voltage. The example of an analog pulse counting circuit being included in readout circuitry 212 is merely illustrative. If desired, readout circuitry 212 may include digital pulse counting circuits. Readout circuitry 212 may also include amplification circuitry if desired.

The example in FIG. 1 of readout circuitry 212 being coupled to a node between diode 204 and quenching circuitry 206 is merely illustrative. Readout circuitry 212 may be coupled to terminal 208 or any desired portion of the SPAD device. In some cases, quenching circuitry 206 may be considered integral with readout circuitry 212.

Because SPAD devices can detect a single incident photon, the SPAD devices are effective at imaging scenes with low light levels. Each SPAD may detect the number of photons that are received within a given period of time (e.g., using readout circuitry that includes a counting circuit). However, as discussed above, each time a photon is received and an avalanche current initiated, the SPAD device must be quenched and reset before being ready to detect another photon. As incident light levels increase, the reset time becomes limiting to the dynamic range of the SPAD device (e.g., once incident light levels exceed a given level, the SPAD device is triggered immediately upon being reset).

Figure 2:
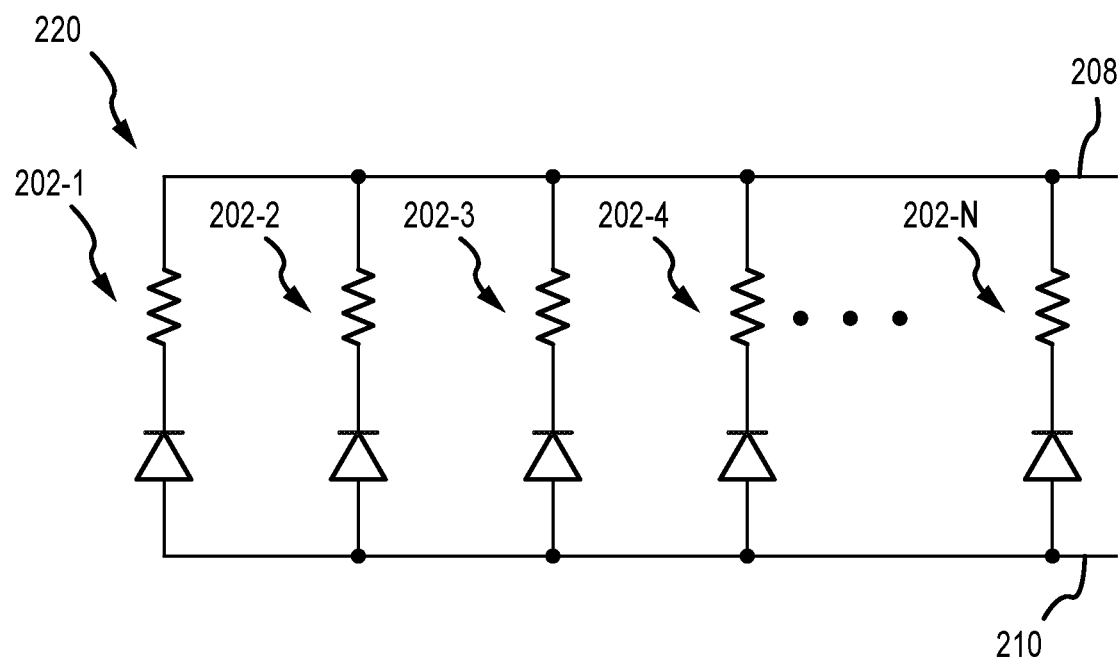
FIG. 2 is a diagram of an illustrative silicon photomultiplier in accordance with an embodiment.

Multiple SPAD devices may be grouped together to help increase dynamic range. FIG. 2 is a circuit diagram of an illustrative group 220 of SPAD devices 202. The group or array of SPAD devices may sometimes be referred to as a silicon photomultiplier (SiPM). As shown in FIG. 2, silicon photomultiplier 220 may include multiple SPAD devices that are coupled in parallel between first supply voltage terminal 208 and second supply voltage terminal 210. FIG. 2 shows N SPAD devices 202 coupled in parallel (e.g., SPAD device 202-1, SPAD device 202-2, SPAD device 202-3, SPAD device 202-4, . . . , SPAD device 202-N). More than two SPAD devices, more than ten SPAD devices, more than one hundred SPAD devices, more than one thousand SPAD devices, etc. may be included in a given silicon photomultiplier 220.

Each SPAD device 202 may sometimes be referred to herein as a SPAD pixel 202. Although not shown explicitly in FIG. 2, readout circuitry for the silicon photomultiplier 220 may measure the combined output current from all of SPAD pixels in the silicon photomultiplier. Configured in this way, the dynamic range of an imaging system including the SPAD pixels may be increased. Each SPAD pixel is not guaranteed to have an avalanche current triggered when an incident photon is received. The SPAD pixels may have an associated probability of an avalanche current being triggered when an incident photon is received. There is a first probability of an electron being created when a photon reaches the diode and then a second probability of the electron triggering an avalanche current. The total probability of a photon triggering an avalanche current may be referred to as the SPAD's photon-detection efficiency (PDE). Grouping multiple SPAD pixels together in the silicon photomultiplier therefore allows for a more accurate measurement of the incoming incident light. For example, if a single SPAD pixel has a PDE of 50% and receives one photon during a time period, there is a 50% chance the photon will not be detected. With the silicon photomultiplier 220 of FIG. 2, chances are that two of the four SPAD pixels will detect the photon, thus improving the provided image data for the time period.

The example of FIG. 2 in which the plurality of SPAD pixels 202 share a common output in silicon photomultiplier 220 is merely illustrative. In the case of an imaging system including a silicon photomultiplier having a common output for all of the SPAD pixels, the imaging system may not have any resolution in imaging a scene (e.g., the silicon photomultiplier can just detect photon flux at a single point). It may be desirable to use SPAD pixels to obtain image data across an array to allow a higher resolution reproduction of the imaged scene. In cases such as these, SPAD pixels in a single imaging system may have per-pixel readout capabilities. Alternatively, an array of silicon photomultipliers (each including more than one SPAD pixel) may be included in the imaging system. The outputs from each pixel or from each silicon photomultiplier may be used to generate image data for an imaged scene. The array may be capable of independent detection (whether using a single SPAD pixel or a plurality of SPAD pixels in a silicon photomultiplier) in a line array (e.g., an array having a single row and multiple columns or a single column and multiple rows) or an array having more than ten, more than one hundred, or more than one thousand rows and/or columns.

While there are a number of possible use cases for SPAD pixels as discussed above, the underlying technology used to detect incident light is the same. All of the aforementioned examples of devices that use SPAD pixels may collectively be referred to as SPAD-based semiconductor devices. A silicon photomultiplier with a plurality of SPAD pixels having a common output may be referred to as a SPAD-based semiconductor device. An array of SPAD pixels with per-pixel readout capabilities may be referred to as a SPAD-based semiconductor device. An array of silicon photomultipliers with per-silicon-photomultiplier readout capabilities may be referred to as a SPAD-based semiconductor device.

Figure 3:
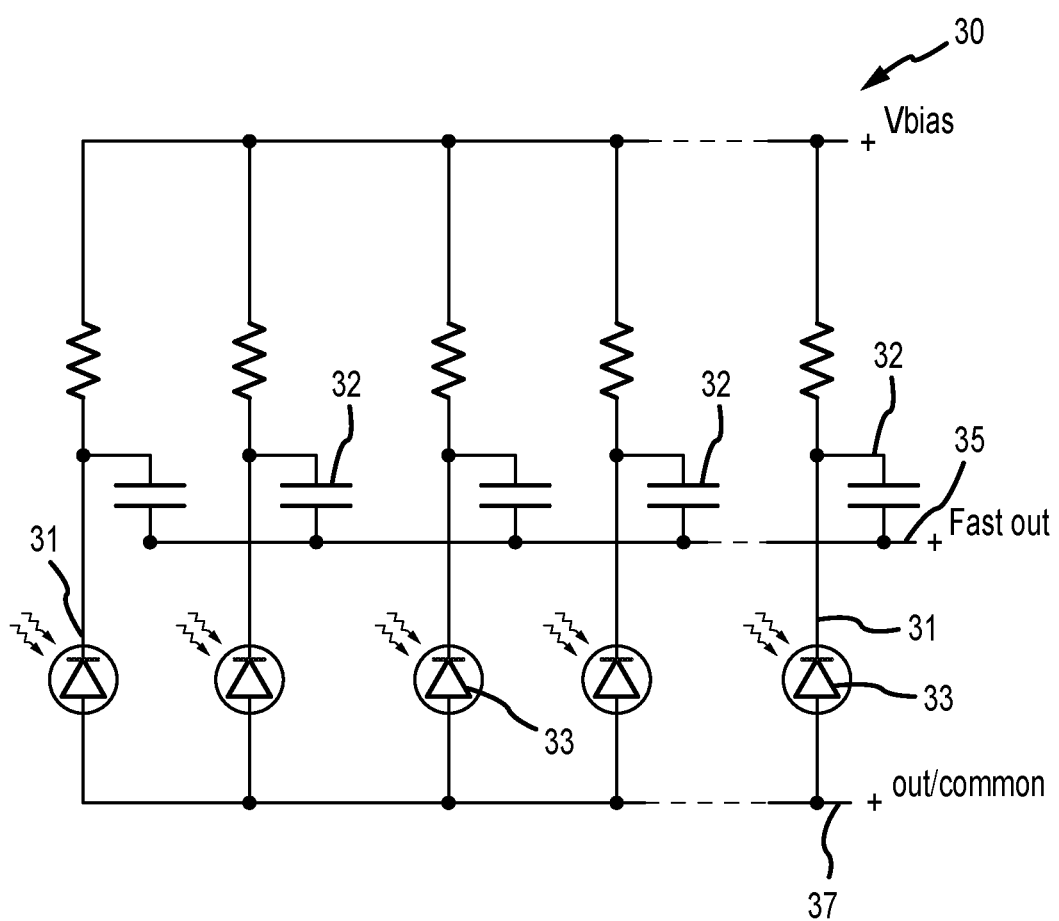
FIG. 3 is a schematic diagram of an illustrative silicon photomultiplier with a fast output terminal in accordance with an embodiment.

FIG. 3 illustrates a silicon photomultiplier 30. As shown in FIG. 3, SiPM 30 has a third terminal 35 which is capacitively coupled to each cathode terminal 31 in order to provide a fast readout of the avalanche signals from the SPADs 33. When then SPADs 33 emits a current pulse, part of the resulting change in voltage at the cathode 31 will be coupled via the mutual capacitance into the third ("fast") output terminal 35. Using the third terminal 35 for readout avoids the compromised transient performance resulting from the relatively large RC time constant associated with the biasing circuit that biases the top terminal of the quenching resistor.

Figure 4:
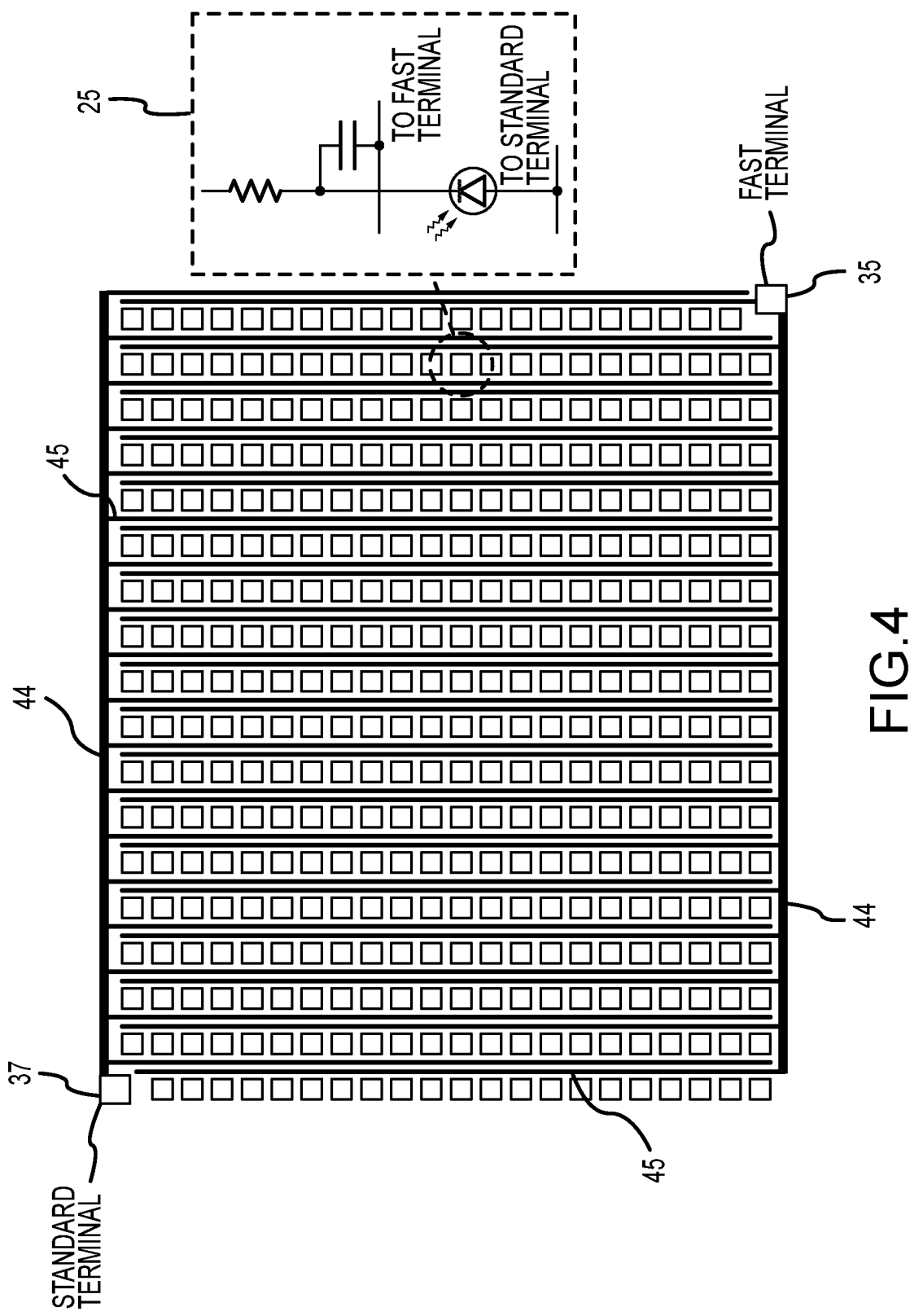
FIG. 4 is a diagram of an illustrative silicon photomultiplier comprising an array of microcells.

It will be appreciated by those skilled in the art that silicon photomultipliers include major bus lines 44 and minor bus lines 45 as illustrated in FIG. 4. The minor bus lines 45 may connect directly to each individual microcell 25. The minor bus lines 45 are then coupled to the major bus lines 44 which connect to the bond pads associated with terminals 37 and 35. Typically, the minor bus lines 45 extend vertically between the columns of microcells 25, whereas the major bus lines 44 extend horizontally adjacent the outer row of the microcells 25.

Figure 5:
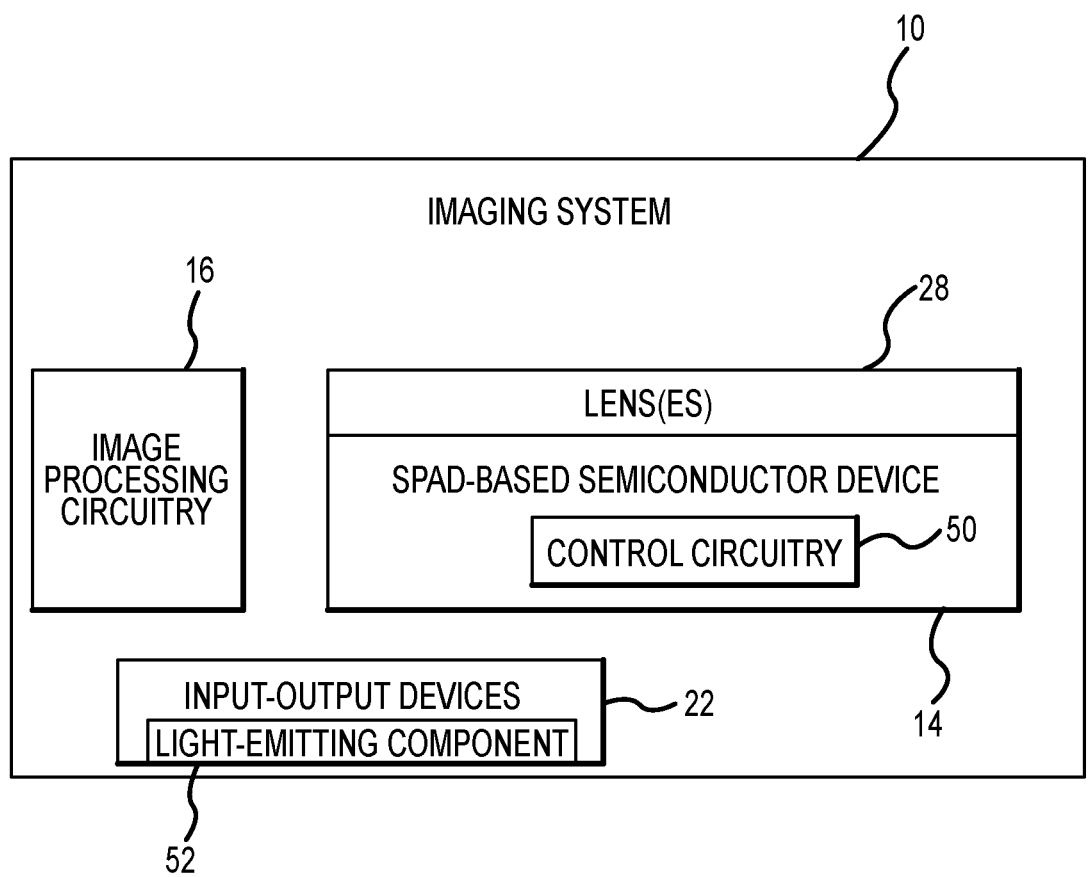
FIG. 5 is a schematic diagram of an illustrative imaging system that includes a SPAD-based semiconductor device in accordance with an embodiment.

An imaging system 10 with a SPAD-based semiconductor device is shown in FIG. 5. Imaging system 10 may be an electronic device such as a digital camera, a computer, a cellular telephone, a medical device, or other electronic device. Imaging system 10 may be an imaging system on a vehicle (sometimes referred to as vehicular imaging system). Imaging system may be used for LIDAR applications. Imaging system 10 may sometimes be referred to as a SPAD-based imaging system.

Imaging system 10 may include one or more SPAD-based semiconductor devices 14 (sometimes referred to as semiconductor devices 14, devices 14, SPAD-based image sensors 14, or image sensors 14). One or more lenses 28 may optionally cover each semiconductor device 14. During operation, lenses 28 (sometimes referred to as optics 28) may focus light onto SPAD-based semiconductor device 14. SPAD-based semiconductor device 14 may include SPAD pixels that convert the light into digital data. The SPAD-based semiconductor device may have any number of SPAD pixels (e.g., hundreds, thousands, millions, or more). In some SPAD-based semiconductor devices, each SPAD pixel may be covered by a respective color filter element and/or microlens.

SPAD-based semiconductor device 14 may include circuitry such as control circuitry 50. The control circuitry for the SPAD-based semiconductor device may be formed either on-chip (e.g., on the same semiconductor substrate as the SPAD devices) or off-chip (e.g., on a different semiconductor substrate as the SPAD devices). The control circuitry may control operation of the SPAD-based semiconductor device. For example, the control circuitry may operate active quenching circuitry within the SPAD-based semiconductor device, may control a bias voltage provided to bias voltage supply terminal 208 of each SPAD, may control/monitor the readout circuitry coupled to the SPAD devices, etc.

The SPAD-based semiconductor device 14 may optionally include additional circuitry such as logic gates, digital counters, time-to-digital converters, bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc. Any of the aforementioned circuits may be considered part of the control circuitry 50 of FIG. 5.

Image data from SPAD-based semiconductor device 14 may be provided to image processing circuitry 16. Image processing circuitry 16 may be used to perform image processing functions such as automatic focusing functions, depth sensing, data formatting, adjusting white balance and exposure, implementing video image stabilization, face detection, etc. For example, during automatic focusing operations, image processing circuitry 16 may process data gathered by the SPAD pixels to determine the magnitude and direction of lens movement (e.g., movement of lens 28) needed to bring an object of interest into focus. Image processing circuitry 16 may process data gathered by the SPAD pixels to determine a depth map of the scene. In some cases, some or all of control circuitry 50 may be formed integrally with image processing circuitry 16.

Imaging system 10 may provide a user with numerous high-level functions. In a computer or advanced cellular telephone, for example, a user may be provided with the ability to run user applications. To implement these functions, the imaging system may include input-output devices 22 such as keypads, buttons, input-output ports, joysticks, and displays. Additional storage and processing circuitry such as volatile and nonvolatile memory (e.g., random-access memory, flash memory, hard drives, solid state drives, etc.), microprocessors, microcontrollers, digital signal processors, application specific integrated circuits, and/or other processing circuits may also be included in the imaging system.

Input-output devices 22 may include output devices that work in combination with the SPAD-based semiconductor device. For example, a light-emitting component 52 may be included in the imaging system to emit light (e.g., infrared light or light of any other desired type). Light-emitting component 52 may be a laser, light-emitting diode, or any other desired type of light-emitting component. Semiconductor device 14 may measure the reflection of the light off of an object to measure distance to the object in a LIDAR (light detection and ranging) scheme. Control circuitry 50 that is used to control operation of the SPAD-based semiconductor device may also optionally be used to control operation of light-emitting component 52. Image processing circuitry 16 may use known times (or a known pattern) of light pulses from the light-emitting component while processing data from the SPAD-based semiconductor device.

In general, it may be desirable for SPAD devices to have a high photon detection efficiency (PDE). The total probability of a photon triggering an avalanche current may be referred to as the SPAD's photon-detection efficiency (PDE). It may be desirable for the SPAD to have a higher PDE, as this improves the sensitivity and performance of the SPAD. However, a high PDE may also limit the dynamic range of the SPAD. Due to the high sensitivity provided by the high PDE, a SPAD with high PDE may have a low maximum input photon rate (which is equal to 1/(PDE× recovery time)). A high PDE therefore causes saturation and low signal-to-noise ratio (SNR) in high light conditions.

Figure 6:
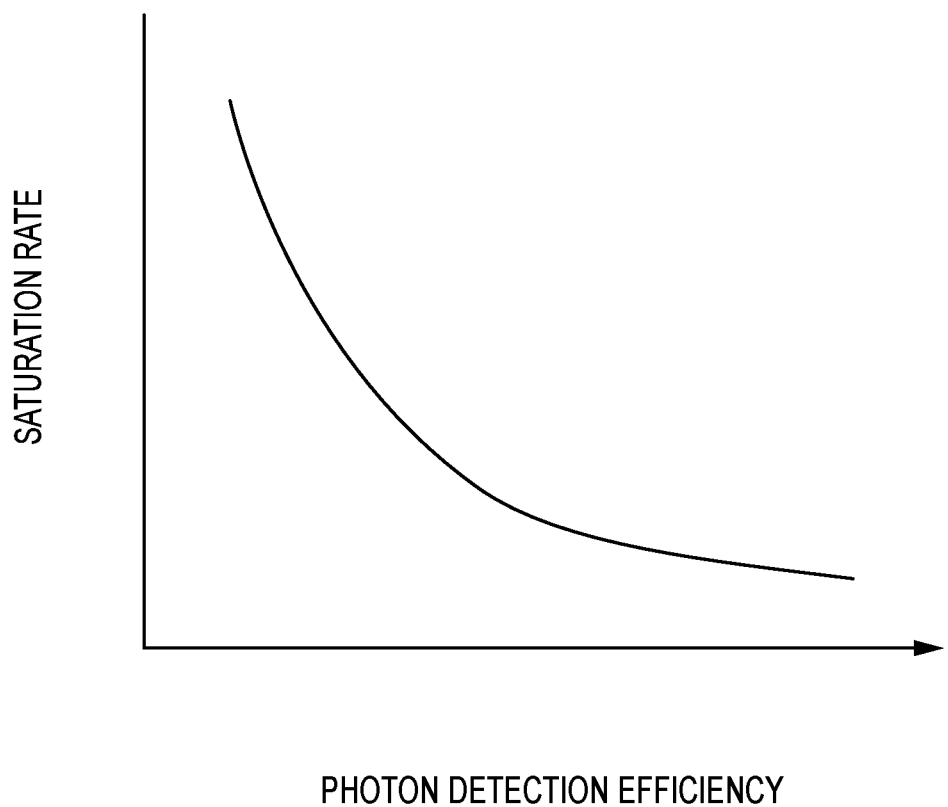
FIG. 6 is a graph showing saturation rate as a function of photon detection efficiency in accordance with an embodiment.

FIG. 6 is a graph showing saturation rate as a function of photon detection efficiency. As shown, the saturation rate (sometimes referred to as saturation level) is at a maximum when the photon detection efficiency is at a minimum. As photon detection efficiency increases, the saturation rate decreases.

Figure 7:
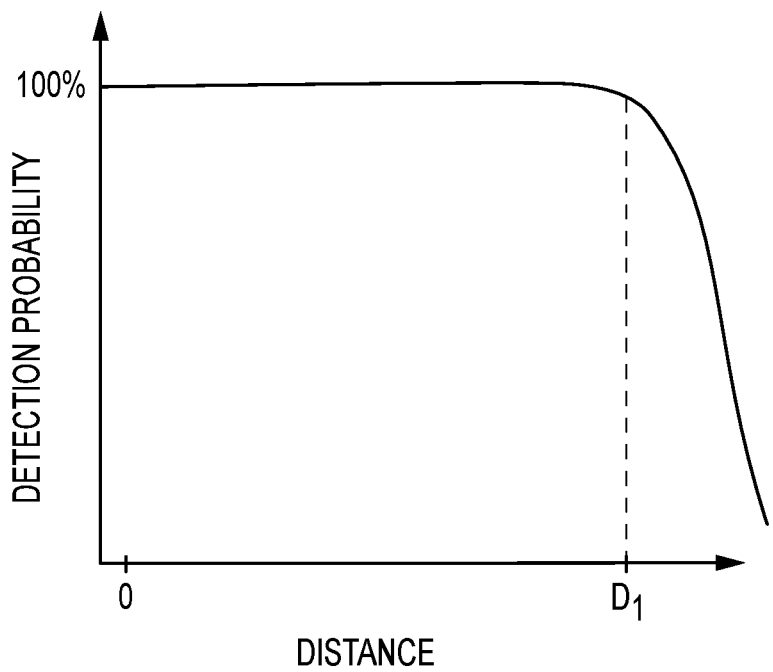
FIG. 7 is a graph of detection probability as a function of distance for a SPAD-based semiconductor device operating in low ambient light conditions in accordance with an embodiment.
Figure 8:
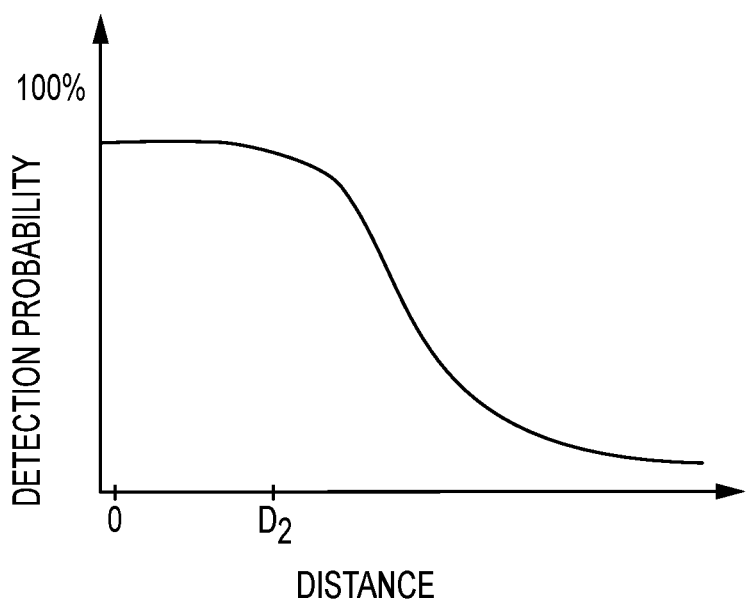
FIG. 8 is a graph of detection probability as a function of distance for a SPAD-based semiconductor device operating in high ambient light conditions in accordance with an embodiment.

FIGS. 7 and 8 illustrate the effect of ambient light conditions on a SPAD-based semiconductor device. FIG. 7 is a graph of detection probability versus distance for a SPAD-based semiconductor device (e.g., a silicon photomultiplier) operating in low light conditions. FIG. 8 is a graph of detection probability versus distance for a SPAD-based semiconductor device (e.g., a silicon photomultiplier) operating in high light conditions. Distance probability may refer to applications where the SPAD-based semiconductor device 14 is used in combination with light-emitting component 52 to measure distance to an object (e.g., LIDAR applications). In LIDAR applications, semiconductor device 14 may measure the reflection of the light off of an object to measure distance to the object. Detection probability refers to the probability that the semiconductor device 14 correctly measures the distance to the imaged object. As objects move further away, it may be more difficult to correctly measure the distance to the object.

As shown in FIG. 7, in low light conditions, the detection probability may start at approximately 100% at low distances. As the distance increases, the detection probability may remain at approximately 100% until distance $D_1$. At distance $D_1$, the detection probability starts to decrease (with increasing distance) as shown in the graph. Distance $D_1$ may be between 100 and 200 meters, greater than 100 meters, greater than 50 meters, etc. The SPAD-based semiconductor device profiled in FIG. 7 may have a relatively high photon detection efficiency (PDE). Consequently, in low light conditions the detection probability is approximately 100% for a relatively long range. However, the performance of the SPAD-based semiconductor device may be limited in high ambient light conditions. As discussed in connection with FIG. 6, due to the high photon detection efficiency, the SPAD-based semiconductor device has a low saturation rate.

As shown in FIG. 8, in high ambient light conditions, the detection probability may start at a level that is less than 100%. The detection probability also may decrease from its peak starting at distance $D_2$. Distance $D_2$ in FIG. 8 may be less than distance $D_1$ in FIG. 7. Due to saturation of the SPAD-based semiconductor device caused by the high light levels, the ambient light may be difficult to distinguish from the light from light-emitting component 52. Therefore, the detection probability is reduced in the high light conditions.

In high light conditions, it is therefore desirable for the photon detection efficiency to be reduced to increase the saturation level of the SPAD devices in the SPAD-based semiconductor device. To optimize performance of the SPAD-based semiconductor device in a wide range of ambient light conditions, the SPAD-based semiconductor may operate using a high dynamic range exposure scheme. When only one type of exposure is used by the SPAD-based semiconductor device, there will be a tradeoff between high light level performance and low light level performance. For example, if a low photon detection efficiency is used, the SPAD-based semiconductor device may have improved high light level performance but a lower overall detection range. If a high photon detection efficiency is used, the SPAD-based semiconductor device may have a far range of effective detection in low ambient light conditions but may perform poorly in high ambient light conditions.

To leverage the advantages of both a low PDE and a high PDE, the SPAD-based semiconductor device may use two sub-exposures, one with a low PDE and one with a high PDE. The image data from both of the sub-exposures may be used by image processing circuitry to produce a single high dynamic range depth map.

The SPAD-based semiconductor device may therefore dynamically switch between a low PDE and a high PDE during operation. To achieve this control over PDE, the over-bias voltage of the SPAD devices may be modulated. The over-bias voltage may refer to the amount that the bias voltage (e.g., the bias voltage at terminal 208 in FIG. 1) exceeds the breakdown voltage of the SPAD. Breakdown voltage is the largest reverse voltage that can be applied to a SPAD without causing an exponential increase in the leakage current in the diode. The more the bias voltage exceeds the breakdown voltage (e.g., the larger the over-bias voltage or over-bias amount), the more sensitive the SPAD becomes.

Figure 9:
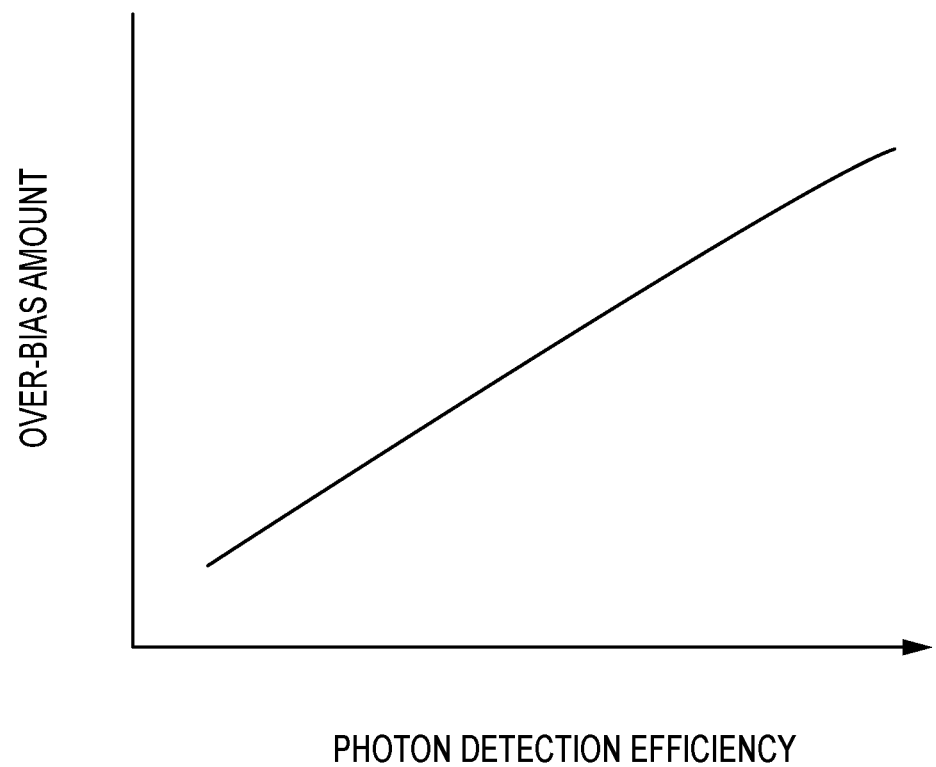
FIG. 9 is a graph illustrating of over-bias amount as a function of photon detection efficiency showing how photon detection efficiency increases with increasing over-bias in accordance with an embodiment.

FIG. 9 is a graph illustrating how photon detection efficiency increases with increasing over-bias. Increasing the over-bias amount may result in an increase in PDE, as shown by the graph of FIG. 9. The linear profile of FIG. 9 is merely illustrative.

Changing the over-bias voltage between low and high levels may allow the SPAD devices to be changed between low and high photon detection efficiencies. Control circuitry such as control circuitry 50 may change the bias voltage provided to terminal 208 between different sub-exposures.

Figure 10:
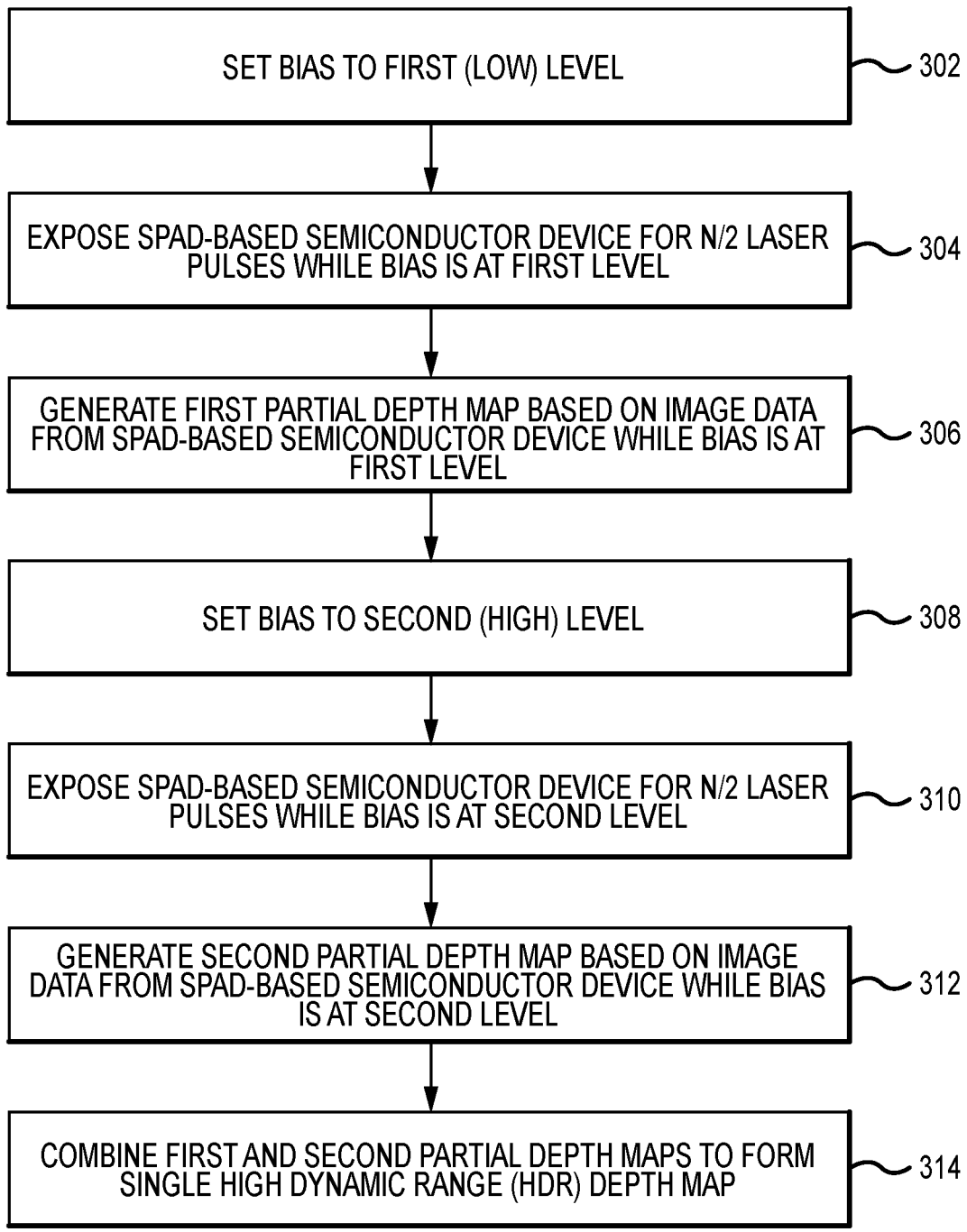
FIG. 10 is a flowchart showing illustrative steps for operating a SPAD-based semiconductor device with different sub-exposures to produce a high dynamic range depth map in accordance with an embodiment.

FIG. 10 is a flowchart showing illustrative steps for operating a SPAD-based semiconductor device with different sub-exposures to produce a high dynamic range depth map. First, at step 302, control circuitry 50 may set the bias voltage (e.g., Vbms at terminal 208) to a first level. In other words, the control circuitry 50 may provide a first bias voltage to terminal 208. The first bias voltage may be a low bias voltage with a correspondingly low photon detection efficiency. Next, at step 304, the SPAD-based semiconductor device may have a first sub-exposure while the bias voltage is at the first level. The first sub-exposure may occur for half of the total pulses of the light-emitting component 52 (e.g., N/2 where N is the total number of pulses). Based on the data from the SPAD-based semiconductor device from the first sub-exposure, a first partial depth map may be generated at step 306.

At step 308, control circuitry 50 may set the bias voltage (e.g., $Vb_{bias}$ at terminal 208) to a second level. In other words, the control circuitry 50 may provide a second bias voltage to terminal 208. The second bias voltage may be higher than the first bias voltage. The SPADs may have a correspondingly higher photon detection efficiency. At step 310, the SPAD-based semiconductor device may have a second sub-exposure while the bias voltage is at the second level. The second sub-exposure may occur for half of the total pulses of the light-emitting component 52 (e.g., N/2). Based on the data from the SPAD-based semiconductor device from the second sub-exposure, a second partial depth map may be generated at step 312.

Finally, at step 314, the first and second partial depth maps may be combined to form a single high dynamic range (HDR) depth map. Because the first partial depth map is generated using a low PDE, the first partial depth map may be optimal for high light conditions due to the low saturation point associated with the low PDE. Because the second partial depth map is generated using a high PDE, the second partial depth map may be optimal for low light conditions due to the improved sensitivity associated with the high PDE. Imaging processing circuitry 16 may combine the partial depth maps by selecting the most useful data from each partial depth map. The resulting HDR depth map may have accurate results over a wide range of distances and ambient light conditions.

The example described in FIG. 10 of the low-PDE sub-exposure occurring before the high-PDE sub-exposure is merely illustrative. In general, the sub-exposures may occur in any desired order (e.g., the high-PDE sub-exposure may be before the low-PDE sub-exposure). Additionally, the example of only two sub-exposures is merely illustrative. In some embodiments, three sub-exposures (with three respective over-bias voltages and corresponding PDEs) or more may be performed for each exposure.

Additionally, it should be understood that the example of each sub-exposure having the same duration (e.g., half of the light pulses) is merely illustrative. In some cases, one sub-exposure may have a longer duration than another sub-exposure. For example, the first sub-exposure may occur for one third of the light pulses and the second sub-exposure may occur for two thirds of the light pulses. Any desired sub-exposure durations may be used during each exposure. The sub-exposure durations may remain constant for each exposure or may change between different exposures.

Figure 11:
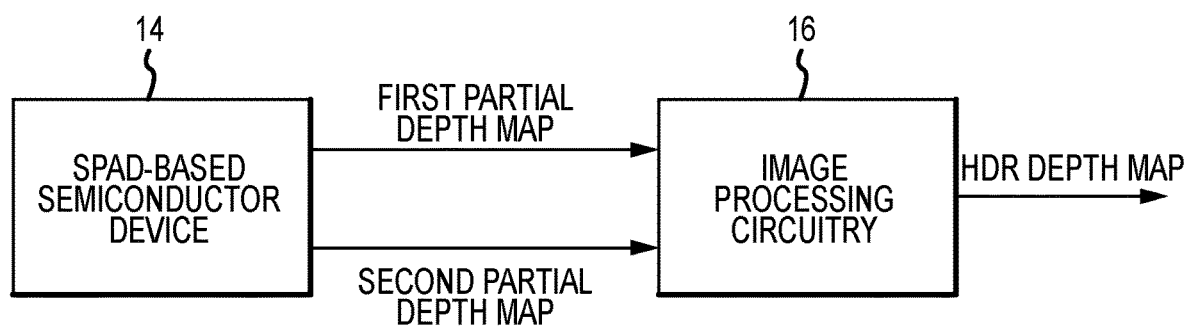
FIG. 11 is a schematic diagram showing how a SPAD-based semiconductor device may generate a first partial depth map during a first sub-exposure and a second partial depth map during a second sub-exposure in accordance with an embodiment.

FIG. 11 is a schematic diagram showing how the SPAD-based semiconductor device 14 may generate a first partial depth map (e.g., first image data) during a first sub-exposure and a second partial depth map (e.g., second image data) during a second sub-exposure. The first partial depth map may be generated while the SPAD devices in the SPAD-based semiconductor device have a low photon detection efficiency. Accordingly, the first partial depth map will have high saturation rate and optimal high light performance. The second partial depth map may be generated while the SPAD devices in the SPAD-based semiconductor device have a high photon detection efficiency. Accordingly, the second partial depth map will have high sensitivity and optimal low light performance.

Image processing circuitry 16 may receive the first and second partial depth maps from the SPAD-based semiconductor device and may generate a single HDR depth map. The HDR depth map may be associated with a single exposure of the SPAD-based semiconductor device. Subsequent exposures may be performed to produce additional HDR depth maps, allowing objects in a scene to be tracked over time.

Image processing circuitry 16 may generate the HDR depth map using any desired techniques. The HDR depth map may be a superposition of the first and second partial depth maps, in one illustrative example. The image processing circuitry may include memory for storing image data that is used to then form the HDR depth map.

Figure 12:
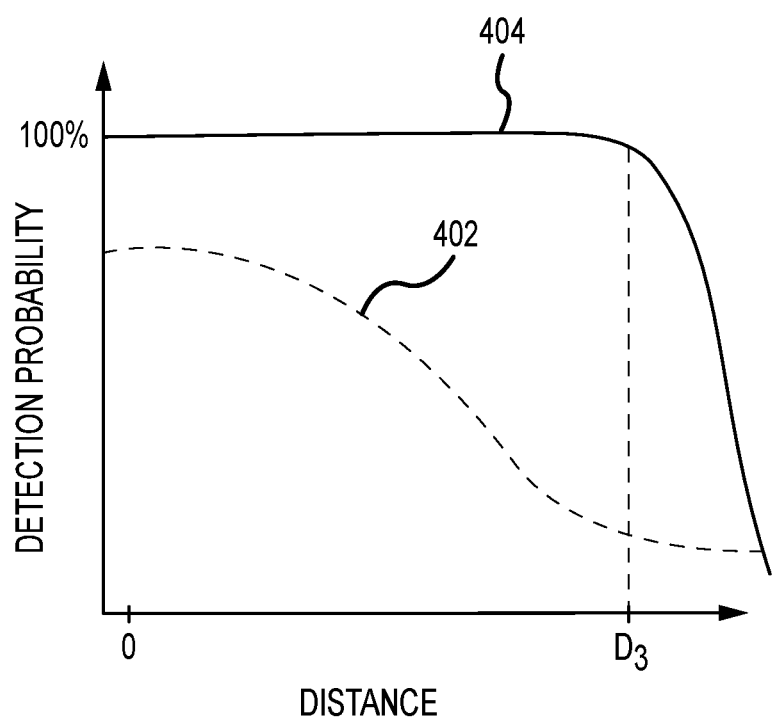
FIG. 12 is a graph of detection probability as a function of distance for a SPAD-based semiconductor device having multiple sub-exposures with different photon detection efficiencies in accordance with an embodiment.

FIG. 12 is a graph of detection probability versus distance for a SPAD-based semiconductor device (e.g., a silicon photomultiplier) having multiple sub-exposures with different photon detection efficiencies. The graph of FIG. 12 shows performance of the SPAD-based semiconductor device during high light conditions. Profile 402 shows the detection probability of a single-exposure SPAD-based semiconductor device with a high photon detection efficiency during high light conditions (similar to as shown in FIG. 8). As shown, without the multiple sub-exposure high dynamic range scheme, the detection probability starts below 100% and decreases quickly.

In contrast, profile 404 shows the detection probability of a SPAD-based semiconductor device having multiple sub-exposures with different photon detection efficiencies. As shown by profile 404, the detection probability may start at approximately 100% at low distances. As the distance increases, the detection probability may remain at approximately 100% until distance $D_3$. At distance $D_3$, the detection probability starts to decrease (with increasing distance) as shown in the graph. Distance $D_3$ may be between 100 and 200 meters, greater than 100 meters, greater than 150 meters, etc.

Therefore, the high dynamic range sub-exposure scheme allows for a high detection probability even in high light conditions. The detection probability profile 404 may be similar regardless of ambient light levels due to the high dynamic range afforded by the different sub-exposures with different photon detection efficiencies.

The foregoing is merely illustrative of the principles of this invention and various modifications can be made by those skilled in the art. The foregoing embodiments may be implemented individually or in any combination.

What is claimed is:

1. An imaging system comprising:
   a semiconductor device comprising a plurality of single-photon avalanche diodes;
   a light-emitting component configured to emit a plurality of light pulses; and
   control circuitry configured to:
      set a bias voltage for the plurality of single-photon avalanche diodes to a first voltage level during a first sub-exposure;
      expose the plurality of single-photon avalanche diodes to a first subset of the plurality of light pulses during the first sub-exposure;
      set the bias voltage for the plurality of single-photon avalanche diodes to a second voltage level during a second sub-exposure, wherein the second voltage level is different than the first voltage level; and
      expose the plurality of single-photon avalanche diodes to a second subset of the plurality of light pulses during the second sub-exposure; and
   image processing circuitry configured to generate a high dynamic range depth map based on data from the first and second sub-exposures.

2. The imaging system defined in claim 1, wherein the semiconductor device is configured to generate a first partial depth map during the first sub-exposure and generate a second partial depth map during the second sub-exposure.

3. An imaging system comprising:
   a semiconductor device comprising a plurality of single-photon avalanche diodes;
   a light-emitting component configured to emit a plurality of light pulses; and
   control circuitry configured to:
      set a bias voltage for the plurality of single-photon avalanche diodes to a first voltage level during a first sub-exposure;
      expose the plurality of single-photon avalanche diodes to a first subset of the plurality of light pulses during the first sub-exposure;
      set the bias voltage for the plurality of single-photon avalanche diodes to a second voltage level during a second sub-exposure, wherein the second voltage level is different than the first voltage level; and
      expose the plurality of single-photon avalanche diodes to a second subset of the plurality of light pulses during the second sub-exposure, wherein the first subset of the plurality of light pulses comprises a first half of the plurality of light pulses and wherein the second subset of the plurality of light pulses comprises a second half of the plurality of light pulses.

4. The imaging system defined in claim 1, wherein the light-emitting component comprises a laser.

5. The imaging system defined in claim 1, wherein each one of the plurality of single-photon avalanche diodes comprises an anode coupled to a first voltage supply terminal, a cathode, and quenching circuitry coupled between the cathode and a second voltage supply terminal.

6. The imaging system defined in claim 5, wherein the second voltage supply terminal of each single-photon avalanche diode receives the bias voltage.

7. The imaging system defined in claim 1, wherein the second voltage level is higher than the first voltage level, wherein each one of the plurality of single-photon avalanche diodes has a first photon detection efficiency while the bias voltage is at the first voltage level, wherein each one of the plurality of single-photon avalanche diodes has a second photon detection efficiency while the bias voltage is at the second voltage level, and wherein the second photon detection efficiency is greater than the first photon detection efficiency.

8. A method of operating a semiconductor device that includes a single-photon avalanche diode, comprising:
setting a bias voltage for the single-photon avalanche diode to a first voltage level;
while the bias voltage is at the first voltage level, generating data using the single-photon avalanche diode for a given exposure;
setting the bias voltage for the single-photon avalanche diode to a second voltage level that is different than the first voltage level; and
while the bias voltage is at the second voltage level, generating additional data using the single-photon avalanche diode for the given exposure, wherein the single-photon avalanche diode comprises an anode coupled to a first voltage supply terminal, a cathode, and quenching circuitry coupled between the cathode and a second voltage supply terminal, wherein setting the bias voltage for the single-photon avalanche diode to the first voltage level comprises providing the bias voltage to the second voltage supply terminal at the first voltage level, and wherein setting the bias voltage for the single-photon avalanche diode to the second voltage level comprises providing the bias voltage to the second voltage supply terminal at the second voltage level.

9. The method defined in claim 8, further comprising:
using the data and the additional data to form a single high dynamic range depth map for the given exposure.

10. The method defined in claim 8, wherein the data is part of a first partial depth map, wherein the additional data is part of a second partial depth map, and wherein the method further comprises:
combining the first and second partial depth maps into a single depth map.

11. The method defined in claim 10, wherein combining the first and second partial depth maps into a single depth map comprises combining the first and second partial depth maps into a single high dynamic range depth map.

12. The method defined in claim 8, further comprising:
exposing the single-photon avalanche diode for a first number of light pulses from a light-emitting component while the bias voltage is at the first voltage level; and
exposing the single-photon avalanche diode for the first number of light pulses from the light-emitting component while the bias voltage is at the second voltage level.

13. The method defined in claim 8, wherein the second voltage level is higher than the first voltage level, wherein the single-photon avalanche diode has a first photon detection efficiency while the bias voltage is at the first voltage level, wherein the single-photon avalanche diode has a second photon detection efficiency while the bias voltage is at the second voltage level, and wherein the second photon detection efficiency is greater than the first photon detection efficiency.

* * * * *